United States Patent
Isomatsu et al.

(10) Patent No.: US 9,703,829 B2
(45) Date of Patent: Jul. 11, 2017

(54) DATABASE SYSTEM AND DATABASE MANAGEMENT METHOD

(75) Inventors: Kohei Isomatsu, Tokyo (JP); Shinsuke Hamada, Tokyo (JP); Akira Itou, Tokyo (JP); Kouji Kimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 486 days.

(21) Appl. No.: 14/369,029

(22) PCT Filed: Dec. 26, 2011

(86) PCT No.: PCT/JP2011/080077
§ 371 (c)(1),
(2), (4) Date: Nov. 7, 2014

(87) PCT Pub. No.: WO2013/098918
PCT Pub. Date: Jul. 4, 2013

(65) Prior Publication Data
US 2015/0066943 A1    Mar. 5, 2015

(51) Int. Cl.
*G06F 17/30* (2006.01)

(52) U.S. Cl.
CPC .. *G06F 17/30424* (2013.01); *G06F 17/30321* (2013.01); *G06F 17/30327* (2013.01)

(58) Field of Classification Search
None
See application file for complete search history.

(56) References Cited

U.S. PATENT DOCUMENTS

| | | | |
|---|---|---|---|
| 5,119,490 A | | 6/1992 | Kurose |
| 6,105,025 A | * | 8/2000 | Jacobs ............. G06F 17/30327 |
| 2003/0126116 A1 | * | 7/2003 | Chen ................. G06F 12/0862 |
| 2004/0107186 A1 | | 6/2004 | Najork et al. |
| 2005/0171960 A1 | * | 8/2005 | Lomet .............. G06F 17/30327 |
| 2006/0072615 A1 | * | 4/2006 | Narad ................. H04L 12/2854 370/474 |
| 2006/0294118 A1 | * | 12/2006 | Lubbers ........... G06F 17/30321 |
| 2008/0235252 A1 | * | 9/2008 | Sakai ................ G06F 17/30911 |
| 2009/0307186 A1 | * | 12/2009 | Hoshino ........... G06F 17/30935 |

(Continued)

FOREIGN PATENT DOCUMENTS

| | | |
|---|---|---|
| JP | 63-191226 A | 8/1988 |
| JP | 2004-185617 A | 7/2007 |

(Continued)

*Primary Examiner* — Alex Gofman
*Assistant Examiner* — Umar Mian
(74) *Attorney, Agent, or Firm* — Volpe and Koenig, P.C.

(57) ABSTRACT

A database system comprises an interface for a storage device, and a control device for accessing the storage device through the interface. The storage device stores a table that manages a plurality of rows comprising a plurality of item values, and an index configured in a tree structure based on a plurality of nodes enabling to identify the rows by using one or more item values. The control device identifies an item value condition included in a search condition of a search query, determines whether or not the node of the index corresponding to the item value condition is reference-disabled, and when the node is reference-disabled, identifies a range of item values managed by the reference-disabled node, and searches for a row that satisfies the search condition for the identified range.

9 Claims, 16 Drawing Sheets

(56) References Cited

U.S. PATENT DOCUMENTS

| | | | |
|---|---|---|---|
| 2010/0082664 A1* | 4/2010 | Odaira | G06F 17/30327 707/769 |
| 2010/0161569 A1* | 6/2010 | Schreter | G06F 17/30327 707/696 |
| 2010/0281063 A1* | 11/2010 | Ushiyama | G06F 17/30094 707/797 |
| 2011/0066621 A1* | 3/2011 | Shevitz | G06N 5/02 707/741 |

FOREIGN PATENT DOCUMENTS

| | | |
|---|---|---|
| JP | 2008-065716 A | 3/2008 |
| JP | 2009-252148 A | 10/2009 |

* cited by examiner

Fig. 3

Search query　　　　　　　　　　　　　　　　　　　　　　　　　3010

SELECT * FROM T1　　　　3011
　　WHERE　　C1 BETWEEN 50 AND 200　　3012

Fig. 4

| Row ID | \_6103 C1 | \_6104 Row content C2 | \_6105 C3 | ... |
|---|---|---|---|---|
| XXX | 180 | ... | ... | ... |
| XXX | 100 | ... | ... | ... |
| XXX | 10 | ... | ... | ... |
| XXX | 150 | ... | ... | ... |
| XXX | 20 | ... | ... | ... |
| XXX | 200 | ... | ... | ... |
| XXX | 40 | ... | ... | ... |
| XXX | 80 | ... | ... | ... |
| XXX | 130 | ... | ... | ... |
| XXX | 160 | ... | ... | ... |
| XXX | 70 | ... | ... | ... |
| XXX | 50 | ... | ... | ... |
| XXX | 140 | ... | ... | ... |
| XXX | 120 | ... | ... | ... |
| XXX | 30 | ... | ... | ... |
| XXX | 60 | ... | ... | ... |
| XXX | 110 | ... | ... | ... |
| XXX | 170 | ... | ... | ... |

Fig. 7

Index level number management table — 10000

| Level number | Page # |
|---|---|
| 3 | # 1 |
| 2 | # 8 |
| 1 | # 2 |

10001 — Level number
10002 — Page #

Fig. 8

Index management table (7100)

| Table name (7101) | Index name (7102) | Configuration column (7103) | |
|---|---|---|---|
| T1 | IDX1 | C1 | |
| T1 | IDX2 | C2 | C3 |
| T1 | IDX3 | C1 | C3 |

Fig. 9A

| Program ID | First area | Second area |
|---|---|---|

| Search program ID | Source entry # | Parent entry # |
|---|---|---|

| Alternative search program ID | Source entry # | Parent entry # |
|---|---|---|

| Alternative search program ID | Alternative index root node # | Alternative index use flag |
|---|---|---|

| Alternative search program ID | Table topmost data page # | Table scan flag |
|---|---|---|

Search program information management queue 8100

| | | | |
|---|---|---|---|
| Search #5 | Entry #0008 | Entry #0002 | 8110 |
| Search #4 | Entry #0007 | Entry #0002 | 8110 |
| Search #3 | Entry #0005 | Entry #0001 | 8110 |
| Search #2 | Entry #0004 | Entry #0001 | 8110 |
| Search #1 | Entry #0002 | — | 8110 |

| Alternative search program ID | # 0019 | # 0002 |

| Alternative search program ID | # 0020 | # 0002 |

| Alternative search program ID | # 0021 | # 0002 |

| Alternative search program ID | # 0022 | # 0002 |

| Alternative search program ID | # 0023 | # 0002 |

| Alternative search program ID | # 0024 | # 0002 |

| Alternative search program ID | # 0025 | # 0002 |

| Alternative search program ID | # 0026 | # 0002 |

DATABASE SYSTEM AND DATABASE MANAGEMENT METHOD

TECHNICAL FIELD

The present invention relates to a database system and a database management method for managing a table and an index for searching for a row (a record) of the table.

BACKGROUND ART

There are databases that manage an index of table records so as to be able to rapidly search for a table record stored in the database. In a database system that manages such a database, when a database table is updated, the index is also updated at the same time.

When a write error occurs while updating the index in the database system, there is the danger that the index data could be corrupted, making it impossible to execute a table record search using the index. It is supposed here that a state in which the index data has been corrupted is a "logic crash".

A technique for restoring a database in this state without stopping the provision of database services is known (for example, refer to PTL 1).

CITATION LIST

Patent Literature

[PTL 1]
Japanese Patent Application Laid-open No. 2009-252148

SUMMARY OF INVENTION

Technical Problem

In a case where a database is being restored as mentioned hereinabove, it is not possible to execute a search of a table using the index that is being restored, the table is searched directly, and the search process takes a long time. Also, the search process load increases, thereby having an adverse affect on the performance of other search processes using the same database.

With the above-mentioned problems in mind, an object of the present invention is to provide a technique that enables a search to be executed appropriately and rapidly even when a logic crash has occurred in the index.

Solution to Problem

A database system comprises an interface for a storage device, and a control device for accessing the storage device through the interface. The storage device stores a table for managing a plurality of rows having a plurality of item values, and an index, which is configured in a tree structure based on a plurality of nodes enabling to identify a row by using one or more item values. The control device identifies an item value condition included in a search condition of a search query, determines whether or not an index node corresponding to an item value condition is reference-disabled, and when the node is reference-disabled, identifies a range of item values managed by the reference-disabled node, and searches for a row that satisfies the search condition for the identified range.

The database system may include the above-described storage device.

BRIEF DESCRIPTION OF DRAWINGS

FIG. 3 is a drawing illustrating an example of a search query related to the embodiment.

FIG. 4 is a drawing showing an example of the configuration of a table related to the embodiment.

FIG. 7 is a drawing showing an example of an index level number management table related to the embodiment.

FIG. 8 is a drawing showing an example of an index management table related to the embodiment.

FIG. 9A is a drawing showing an example of the configuration of search program information related to the embodiment; FIG. 9B is a drawing showing a first example of the search program information related to the embodiment; FIG. 9C is a drawing showing a second example of the search program information related to the embodiment; FIG. 9D is a drawing showing a third example of the search program information related to the embodiment; FIG. 9E is a drawing showing a fourth example of the search program information related to the embodiment; and FIG. 9F is a drawing showing an example of the search program information management queue related to the embodiment.

DESCRIPTION OF EMBODIMENT

Figure 1:
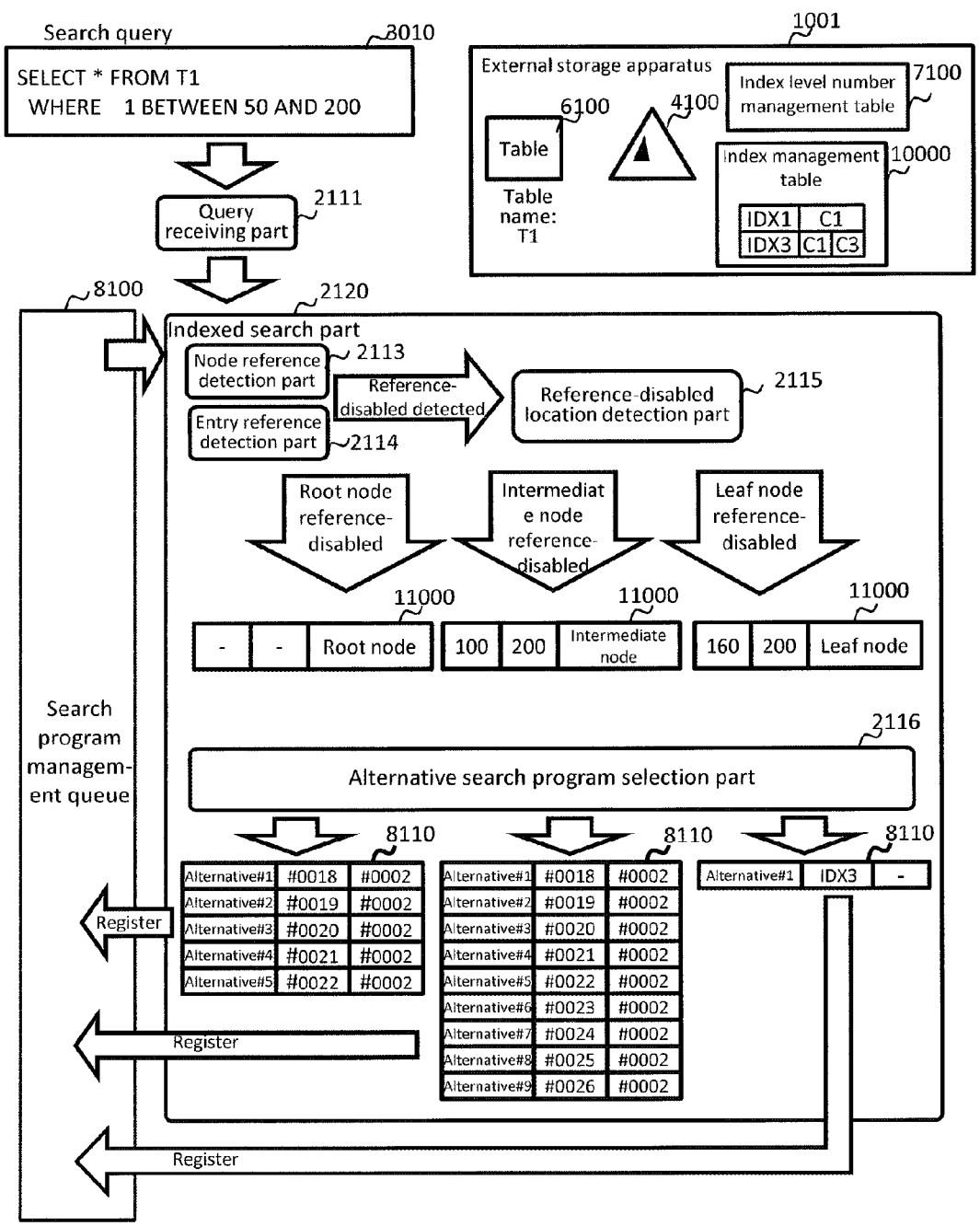
FIG. 1 is a drawing illustrating an example of an overview of processing in a database system related to an embodiment.

The embodiment of the present invention will be explained by referring to the drawings. The embodiment explained hereinbelow does not limit the invention as in the claims, and not all of the components and combinations thereof described in the embodiment are necessarily essential to the solution of the invention.

Furthermore, in the following explanation, various types of information may be explained using the expression "aaa table", but the various information may also be expressed using a data structure other than a table. To show that the various information is not dependent on the data structure, "aaa table" can be called "aaa information".

Also, in the following explanation, there may be cases where processing is explained having either a "program" or a program module as the subject of the sentence, but since the stipulated processing is performed in accordance with a program or a program module being executed by a control device (for example, a processor (for example, a Central Processing Unit (CPU))) while using a storage resource (for example, a memory) and/or a communication interface device (for example, an interface) as needed, the control device may be regarded as the doer of the processing. A process, which is explained having a program or a program module as the subject, may be regarded as a process performed by the control device, or an apparatus or system comprising this control device (for example, a server apparatus). Furthermore, the control device may comprise a hardware circuit that carries out either part or all of the processing. A program may be installed from a program source. The program source, for example, may be either a program delivery server or a storage medium.

First, an overview of the processing of the embodiment will be explained.

FIG. 1 is a drawing illustrating an example of an overview of processing in a database system related to the embodiment.

For example, in a database system comprising an external storage apparatus 1001 and a server apparatus 2100, an indexed search part 2120 executes a search targeted at a root node of an index corresponding to a search query 3010, and a node indicated by search program information 8110 registered in a search program management queue 8100. In so doing, a node reference detection part 2113 detects a reference-disabled in a node 9100, and an entry reference detection part 2114 detects a reference-disabled in an entry 9104 of the node 9100. When reference-disabled is detected, a reference-disabled location identification part 2115 identifies a reference-disabled node search range in accordance with the node type (root node, intermediate node, leaf node), and creates reference-disabled node management information 11000.

An alternative search program selection part 2116, on the basis of the reference-disabled node management information 11000, selects search program information for searching the reference-disabled node search range. In accordance with this, the reference-disabled node search range is also appropriately searched by the indexed search part 2120, and a search result is obtained.

Next, an embodiment of the present invention will be explained in detail.

Figure 2:
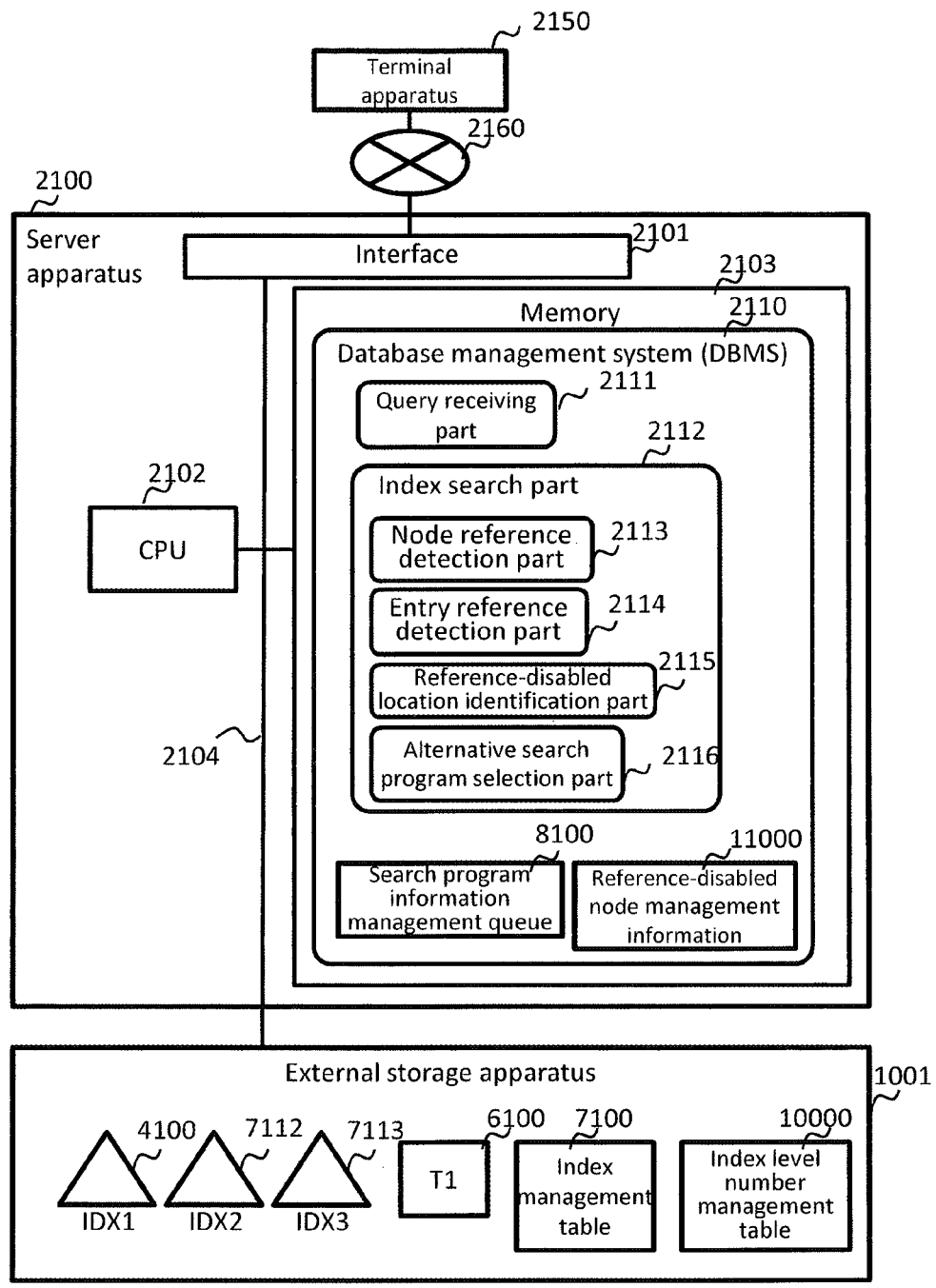
FIG. 2 is a block diagram of an example of a computer system that includes the database system related to the embodiment.

FIG. 2 is a block diagram of a computer system comprising a database system related to the embodiment of the present invention.

The computer system comprises a terminal apparatus 2150, a server apparatus 2100, and an external storage apparatus 1001. The terminal apparatus 2150 and the server apparatus 2100 are connected via a network 2160. The external storage apparatus 1001 is connected to an internal bus 2104 of the server apparatus 2100. The database system here is configured using the server apparatus 2100 and the external storage apparatus 1001.

The terminal apparatus 2150, for example, executes an application that utilizes the database system, and issues a search request (search query) to the server apparatus 2100 with respect to a table 6100 in a database.

FIG. 3 is a drawing illustrating an example of a search query related to the embodiment.

The search query 3010, for example, includes a table specification description 3011 for specifying a search-target table (6100 and so forth), and a search condition description 3012 for specifying a search condition. The search query 3010 shown in FIG. 3 is an example of a search query that uses SQL, and is requesting that table "T1" be the target, and that a row that satisfies a search condition in which the value of a key "C1" is between "50" and "200" be selected.

Returning to the explanation of FIG. 2, the external storage apparatus 1001 stores a table 6100, an index management table 7100, an index level number management table 10000, and indexes 4100, 7112, and 7113. A plurality of tables may also be provided in the external storage apparatus 1001.

FIG. 4 is a drawing showing an example of the configuration of a table related to the embodiment.

The table 6100 stores a plurality of rows (records) comprising a row ID 6101 and row contents 6102. The row ID 6101 stores an ID that uniquely identifies a row in the table 6100. The row contents 6102 includes a plurality of items (6102, 6103, 6104, . . . ). Each item stores a value corresponding to the item. The table 6100, with the table name shown in FIG. 4 of "T1", comprises C1, C2, C3, and so forth as items. C1, C2, and C3, for example, can be used either alone or in combination as a key for a search.

Figure 5:
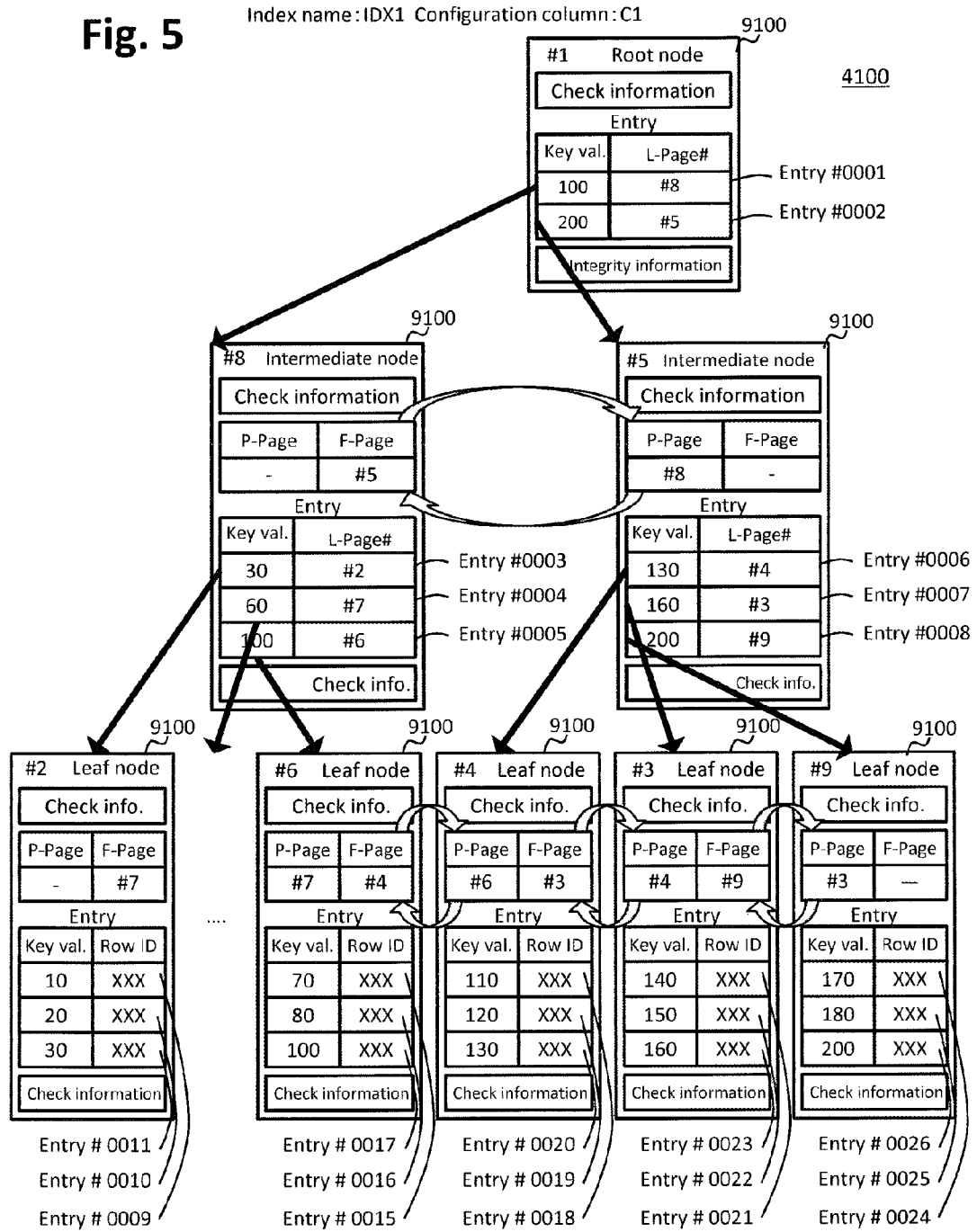
FIG. 5 is a drawing showing an example of the configuration of an index related to the embodiment.
Figure 6:
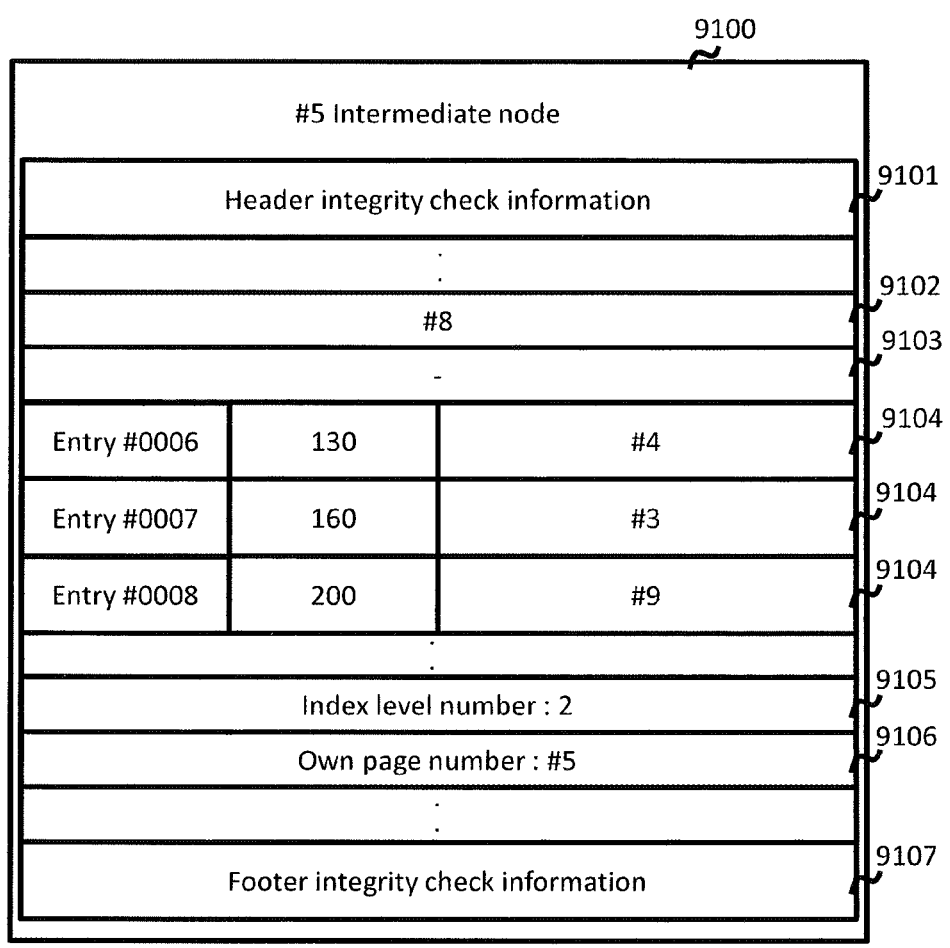
FIG. 6 is a drawing showing an example of the configuration of an index node related to the embodiment.

FIG. 5 is a drawing showing an example of the configuration of an index related to the embodiment. FIG. 6 is a drawing showing an example of the configuration of an index node related to the embodiment.

The index (4100, etc.) is configured as a tree structure based on a plurality of nodes (pages) 9100. Therefore, the nodes 9100 in the index (4100, etc.) are divided into a root node, which is the highest level node, a leaf node, which is the lowest level node, and an intermediate node, which is between the root node and the leaf node. In FIG. 5, the index node hierarchy comprises three levels, with the intermediate node being one level, but the node hierarchy may be more than three levels, in which case the intermediate node exists as two or more levels.

The node 9100, as shown in FIG. 6, includes header integrity check information 9101, a previous page number 9102, a following page number 9103, an entry 9104, an index level number 9105, an own page number 9106, and footer integrity check information 9107.

The header integrity check information 9101 stores a value, such as time data, that is uniquely determined at the time when a page, which is the node, is updated. When a node is updated normally, the value stored in the header integrity check information 9101 is the same as the value stored in the footer integrity check information 9107.

The previous page number 9102 stores the page number of the node immediately prior (previous page) to the corresponding node in the same hierarchy. A NULL value is stored when the corresponding node is the topmost in the hierarchy. The following page number 9103 stores the page number of the node immediately after (following page) the corresponding node in the same hierarchy. A NULL value is stored when the corresponding node is the bottommost in the hierarchy. In the embodiment, the index is arranged in order in the same hierarchy from a node that manages a small-key-value entry, and a previous page manages an entry with a smaller key value than the page, and a following page manages an entry with a larger key value than the page.

The entry 9104, when the node is either a root node or an intermediate node, stores in an associated manner a number (entry number (entry #)) indicating the entry, a page number of a hierarchical node (lower-level node) directly beneath and connected to the node, and the maximum value of the key value managed by the corresponding lower-level node. When the node is a leaf node, the entry 9104 stores in an associated manner the entry #, a key value, and the ID (row ID) of the row in the table 6100 comprising the corresponding key value. One or more entries 9104 can be provided in the node 9100. In the embodiment, entries 9104 are arranged in ascending order on the basis of the maximum value of the key value.

The index level number 9105 stores the level number of the hierarchical level of the corresponding node in the index 4100. In the embodiment, the level number of the leaf node is 1, and the level numbers of the nodes in the higher hierarchical levels become 2, 3, . . . . The own page number 9106 stores the page number of the node. The footer integrity check information 9107 stores a value, such as time data, that is uniquely determined at the time when a page, which is the node, is updated. When a node is updated normally, the value stored in the footer integrity check information 9107 is the same as the value stored in the header integrity check information 9101.

The node 9100 shown in FIG. 6 indicates the last (far right) node in the second level of the index shown in FIG. 5, and in the node 9100, "#8", which is the page number of the previous page, is stored in the previous page number 9102, a NULL value is configured in the following page number 9103 since a following page does not exist, and as the entries 9104, there is an entry having the entry # "0006" that is associated with the page number "#4", and "130", which is the largest key value of the page number node, an entry having the entry # "0007" that is associated with the page number "#3", and "160", which is the largest key value of the page number node, and an entry having the entry # "0008" that is associated with the page number "#9", and "200", which is the largest key value of the page number node, "2" is stored in the index level number, and "#5" is stored in the own page number.

Here, for example, when a logic crash occurs in the node 9100 having the page number "#8" shown in FIG. 5, it is not possible to use the node 9100 to trace the node having "#4", "#3", and "#9" stored as the respective entries 9104 of the node 9100.

FIG. 7 is a drawing showing an example of the index level number management table related to the embodiment.

The index level number management table 10000 is provided corresponding to each index. The index level number management table 10000 comprises a level number 10001 and a page number (#) 10002. The level number 10001 stores the level number of each level included in the corresponding index. In the embodiment, the level number of the leaf node is 1. The page #10002 stores, in the corresponding level node, the page number of the node (page) for which the maximum value of the key value being managed is the smallest. The index level number management table 10000 makes it possible to identify the topmost node in each level.

The index level number management table 10000 shown in the same drawing corresponds to index "IDX1", the configuration of which is shown in FIG. 5, and indicates that the maximum value of the key value managed by page #1 is the smallest in the third level, the maximum value of the key value managed by page #8 is the smallest in the second level, and the maximum value of the key value managed by page #2 is the smallest in the first level.

FIG. 8 is a drawing showing an example of an index management table related to the embodiment.

The index management table 7100 manages records comprising a table name 7101, an index name 7102, and a configuration column 7103. The table name 7101 stores the name (table name) of the table 6100 targeted by an index. The index name 7102 stores the name (index name) of the corresponding index. The configuration column 7103 stores a column (item) comprising a corresponding index, that is, an index-targeted column (item). The configuration column 7103 may store a plurality of columns. For example, the topmost record in the index management table 7100 indicates that the index 4100 "IDX1" of table 61000 "T1" is configured using item "C1", and the third record in the index management table 7100 indicates that the index 7113 "IDX3" of table 61000 "T1" is configured using items "C1" and "C3".

Returning to the explanation of FIG. 2, the server apparatus 2100 comprises an interface 2101, a CPU 2102, and a memory 2103. The interface 2101, the CPU 2102, and the memory 2103 are connected via an internal bus 2104.

The interface 2101 controls communications with the terminal apparatus 2150. The CPU 2102 executes various processes in accordance with executing a program stored in the memory 2103. The memory 2103 stores a program that is executed by the CPU 2102, and data that is used by the CPU 2102. Specifically, the memory 2103 stores a database management system (DBMS) 2110. The database management system 2110 stores a query receiving part 2111 and an index detection part 2112 as program modules.

The query receiving part 2111 receives a search query 3010 transmitted from the terminal apparatus 2150. The query receiving part 2111 creates an execution procedure that includes a search condition for executing a search included in a received search query 3010. The index search part 2112 comprises a node reference detection part 2113, an entry reference detection part 2114, a reference-disabled location identification part 2115, and an alternative search program selection part 2116. The node reference detection part 2113 detects a reference that has been disabled for an index due to either a node-unit exclusion or a logic crash. The entry reference detection part 2114 detects a reference that has been disabled for an index due to either an entry-unit exclusion in the node or a logic crash. The reference-disabled location identification part 2115 identifies a range of key values in a location that is unable to be referenced due to an index logic crash. The alternative search program selection part 2116 selects an alternative search program for executing an indexed search of the range of reference-disabled key values.

The database management system 2110 also stores as data a search program information management queue 8100 and reference-disabled node management information 11000. The search program information management queue 8100 stores search program information used at the time of a search. The reference-disabled node management information 11000 stores information related to a reference-disabled node.

FIG. 9A is a drawing showing an example of the configuration of search program information related to the embodiment. FIG. 9B is a drawing showing a first example of the search program information related to the embodiment. FIG. 9C is a drawing showing a second example of the search program information related to the embodiment. FIG. 9D is a drawing showing a third example of the search program information related to the embodiment. FIG. 9E is a drawing showing a fourth example of the search program information related to the embodiment. FIG. 9F is a drawing showing an example of the search program information management queue related to the embodiment.

The search program information 8110, as shown in FIG. 9A, comprises a search program ID 8111, a first area 8112, and a second area 8113. The search program ID 8111 stores an ID for either a search program or an alternative search program. The first area 8112 and the second area 8113 store various information such as that shown in FIGS. 9B through 9E depending on the type of search program information 8110.

Regarding search program information 8110 for performing a normal search, as shown in FIG. 9B, the first area 8112 stores the number of an entry (source entry) for starting a search.

The second area 8113 stores the number of a parent entry, which is the parent of the source entry.

The search program information 8110 for performing a search (alternative search) for replacing a search relative to a node, which is reference-disabled, stores an ID indicating the alternative search program in the search program ID 8111 as shown in FIG. 9C. The first area 8112 stores the number of an entry (source entry) for starting the search. The second area 8113 stores the number of the parent entry, which is the parent of the source entry. When the parent entry is reference-disabled, the second area 8113 stores the number of the entry that references the parent entry. For example, in a case where the source entry is entry #0018 shown in FIG. 5, when the node #5 is reference-disabled, entry #0002, which references the reference-disabled node #5, is stored in the second area 8113.

The search program information 8110 for performing an alternative search using an alternative index, as shown in FIG. 9D, stores an ID indicating the alternative search program in the search program ID 8111. The first area 8112 stores the root node number (#) of the alternative index to be utilized in the search. The second area 8113 stores a flag (alternative index use flag) indicating that the alternative index is to be used.

The search program information 8110 for performing an alternative search using a table, as shown in FIG. 9E, stores an ID indicating the alternative search program in the search program ID 8111. The first area 8112 stores the topmost data page number (#) of the table (table). The second area 8113 stores a flag (table scan flag) indicating that the table is to be scanned.

The search program information management queue 8100, as shown in FIG. 9F, is able to store one or more pieces of search program information 8110. The search program information 8110 stored in the search program information management queue 8100 is fetched and executed one at a time by the indexed search part 2120.

Figure 10:
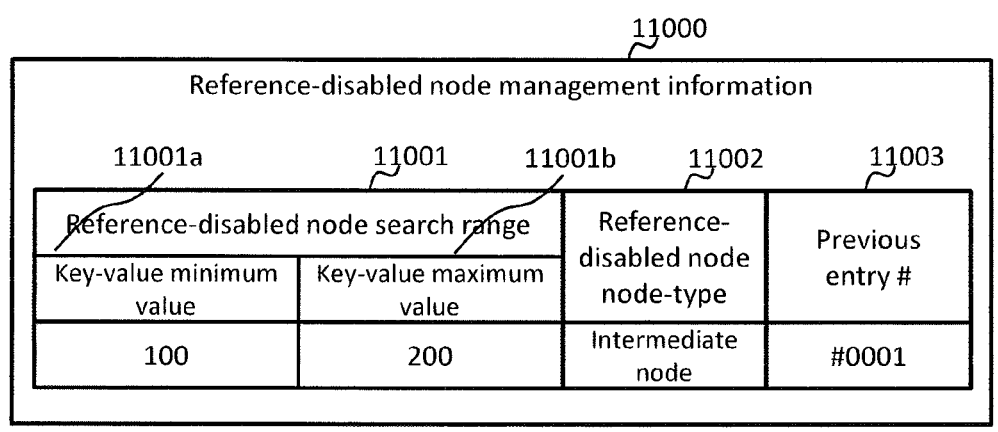
FIG. 10 is a drawing showing an example of the configuration of reference-disabled node management information related to the embodiment.

FIG. 10 is a drawing showing an example of the configuration of reference-disabled node management information related to the embodiment.

The reference-disabled node management information 11000 stores a reference-disabled node search range 11001, a reference-disabled node node-type 11002, and a source entry number (#) 11003.

The reference-disabled node search range 11001 comprises a key-value minimum value 11001a, and a key-value maximum value 11001b. The key-value minimum value 11001a stores the minimum value of the key values, which serve as the search range for nodes that have become reference-disabled (reference-disabled nodes). The key-value maximum value 11001b stores the maximum value of the key values, which serve as the search range for reference-disabled nodes. When a reference-disabled node is a root node, NULL values are stored in the key-value minimum value 11001a and the key-value maximum value 11001b.

The reference-disabled node node-type 11002 stores the node type of the reference-disabled node. The node type is any of a root node, an intermediate node, and a leaf node.

The previous entry number (#) 11003 stores the number of the previous entry (previous entry) in the node (parent node) that includes a reference-disabled node as an entry. The previous entry here is an entry in the immediately preceding node having a key value that is smaller than the key values regarded as a range of reference-disabled nodes. A NULL value is stored when a previous entry does not exist.

For example, when the page #5 node in the index shown in FIG. 4 has become a reference-disabled node, in the reference-disabled node management information 11000, as shown in FIG. 10, "100" is stored in the key-value minimum value 11001a, "200" is stored in the key-value maximum value 11001b, "intermediate node" is stored in the reference-disabled node node-type 11002, and "#0001" is stored in the previous entry #11003.

Processing operations by the server apparatus 2100 of the embodiment will be explained next.

Figure 11:
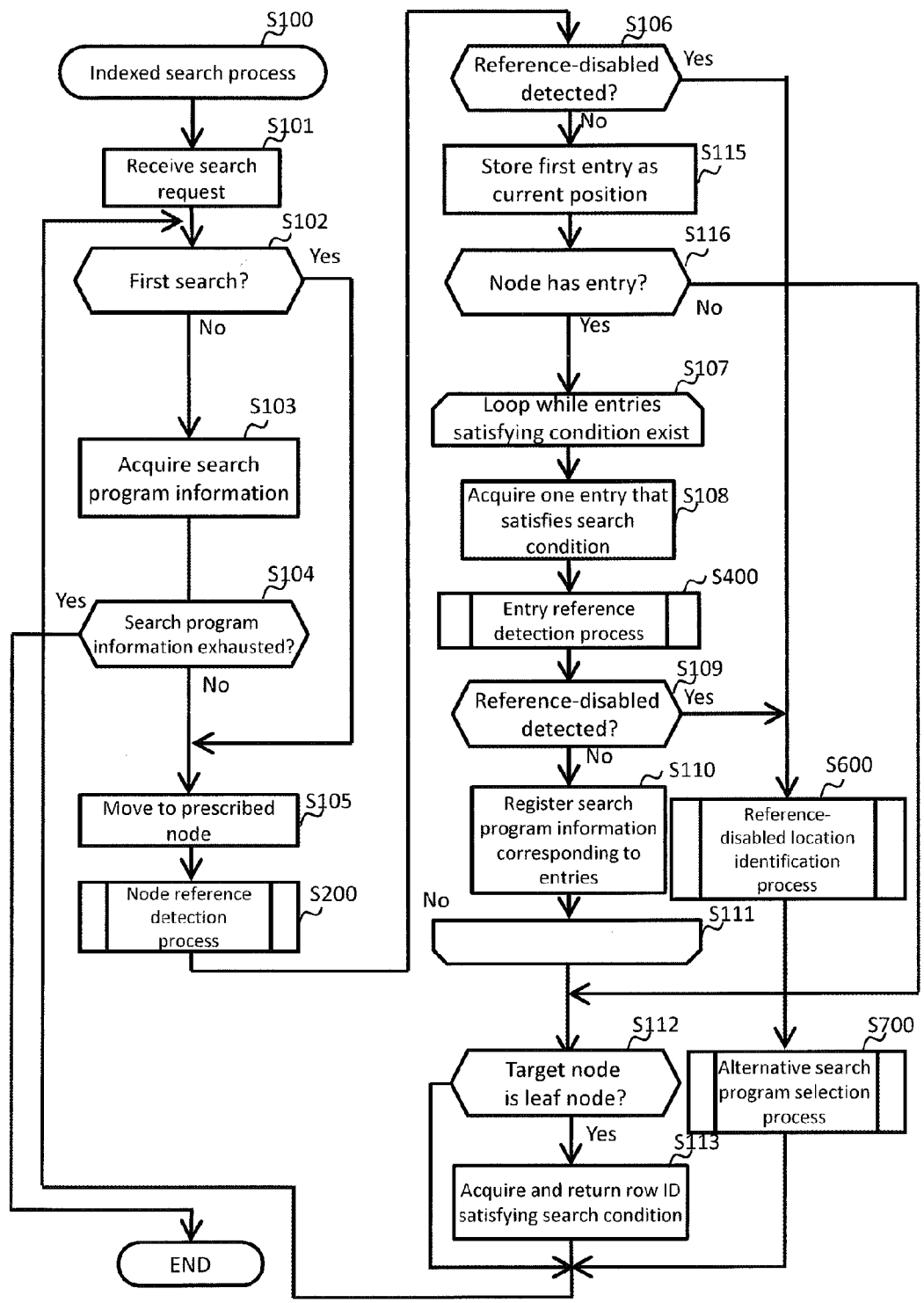
FIG. 11 is a flowchart of an example of an indexed search process related to the embodiment.

FIG. 11 is a flowchart of an indexed search process related to the embodiment.

The indexed search process (Step S100) is realized in accordance with the CPU 2102 executing the index search part 2112. In the indexed search process, the CPU 2102 receives a search request from the query receiving part 2111 (Step S101), and determines whether or not the search will be the first search with respect to the search request, that is, whether or not a result has been returned even one time (Step S102).

When the result is that the search is the initial search (Step S102: Yes), the CPU 2102 advances the processing to Step S105, and, alternatively, when the search is not the initial search (Step S102: No), attempts to acquire the search program information 8110 from the search program information management queue 8100 (Step S103).

The CPU 2102 determines whether or not the search program information 8110 in the search program information management queue 8100 has been exhausted (Step S104). A case in which the result is that the search program information has been exhausted (Step S104: Yes) signifies that the search process corresponding to the search request has ended, and as such, the CPU 2102 ends the processing, and, alternatively, when the search program information 8110 has not been exhausted (Step S104: No), advances the processing to Step S105.

In Step S105, in the case of a first-time search (Step S102: Yes), after moving to the root node and acquiring the search program information 8110, the CPU 2102 moves to the node specified in the search program information 8110. When an alternative index use flag is configured in the search program information 8110, the CPU 2102 uses the alternative index to execute a search focusing on the key value of the search condition. For example, the CPU 2102 executes a search using the alternative index by making the search range the range of key values in the reference-disabled node search range 11001 of the reference-disabled node management information 11000.

Next, the CPU 2102 executes a node reference detection process for detecting the reference status of the target node (Step S200).

Next, the CPU 2102, on the basis of the result of the node reference detection process, determines whether or not reference-disabled was detected (Step S106), and when reference-disabled has not been detected (Step S106: No), stores the first entry in the node as a current position (S115), and when another entry exists in the node (S116: Yes), executes the loop process of Step S107 through Step S111 while entries satisfying the search condition exist.

In the loop process, the CPU 2102 acquires one entry that satisfies the search condition in the target node (Step S108), and executes an entry reference detection process for detecting the reference status of the entry (Step S400). Next, when reference-disabled has not been detected (Step S109: No), the CPU 2102 determines a search ID, creates search program information that includes the search ID, stores the entry # of the acquired entry in the first area 8112, and stores the current source entry in the second area 8113, registers the search program information 8110 in the search program information management queue 8100 (Step S110), and proceeds to Step S111.

Alternatively, when either reference-disabled was detected for the node (Step S106: Yes) or reference-disabled was detected for the entry (Step S109: Yes), the CPU 2102 executes a reference-disabled location identification process (Step S600), executes an alternative search program selection process (Step S700, and moves the processing to Step S102.

When the processing of Step S107 through Step S111 has been executed for all the entries that satisfy the search condition, the CPU 2102 determines whether or not the target node is a leaf node (Step S112), and when the target node is not a leaf node (Step S112: No), moves the processing to Step S102 in order to continue another search process, and alternatively, when the target node is a leaf node (Step S112: Yes), acquires and returns a row ID that satisfies the search condition (Step S113), and moves the processing to Step S102.

For example, in Step S103 of the processing shown in FIG. 11, when the CPU 2102 has acquired search program information 8110 (comprising entry #0006 in the first area 8112, and entry #0002 in the second area 8113) for searching leaf node #4 shown in FIG. 5, assuming that the search condition is (50≤key (C1)≤200), in Step S110 shown in FIG. 11, two pieces of search program information comprising #0019 and #0020 are created in the first area 8112 and registered in the search program information management queue 8100, the row ID corresponding to entry #0018 is acquired in Step S113, and a process for returning the row ID as a portion of the search result is executed.

Figure 12:
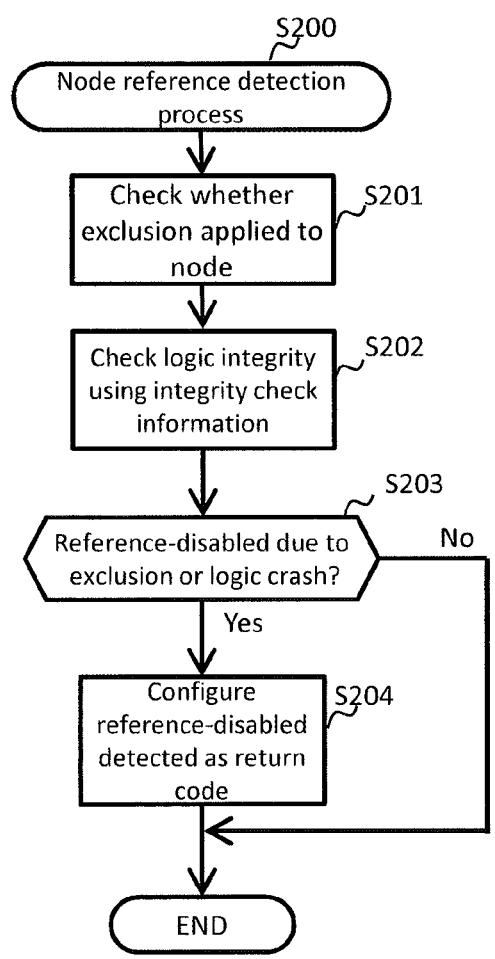
FIG. 12 is a flowchart of an example of a node reference detection process related to the embodiment.

FIG. 12 is a flowchart of a node reference detection process related to the embodiment.

The node reference detection process (Step S200) is realized in accordance with the CPU 2102 executing the node reference detection part 2113. In the node reference detection process, the CPU 2102 checks whether or not an exclusion is being applied to the target node (Step S201), and, in addition, checks whether or not logic integrity is being maintained, in other words, whether or not a logic crash has occurred by checking whether or not the value of the header integrity check information 9101 of the target node 9100 matches the value of the footer integrity check information 9107 (Step S202).

On the basis of the result of this check, the CPU 2102 determines whether or not the target node is reference-disabled due to either an exclusion or the occurrence of a logic crash (Step S203). When the result of the determination is that the target node is reference-disabled (Step S203: Yes), the CPU 2102 configures reference-disabled detected as the return code (Step S204), and ends the processing, and, alternatively, when the target node is not reference-disabled (Step S203: No), ends the processing as-is.

Figure 13:
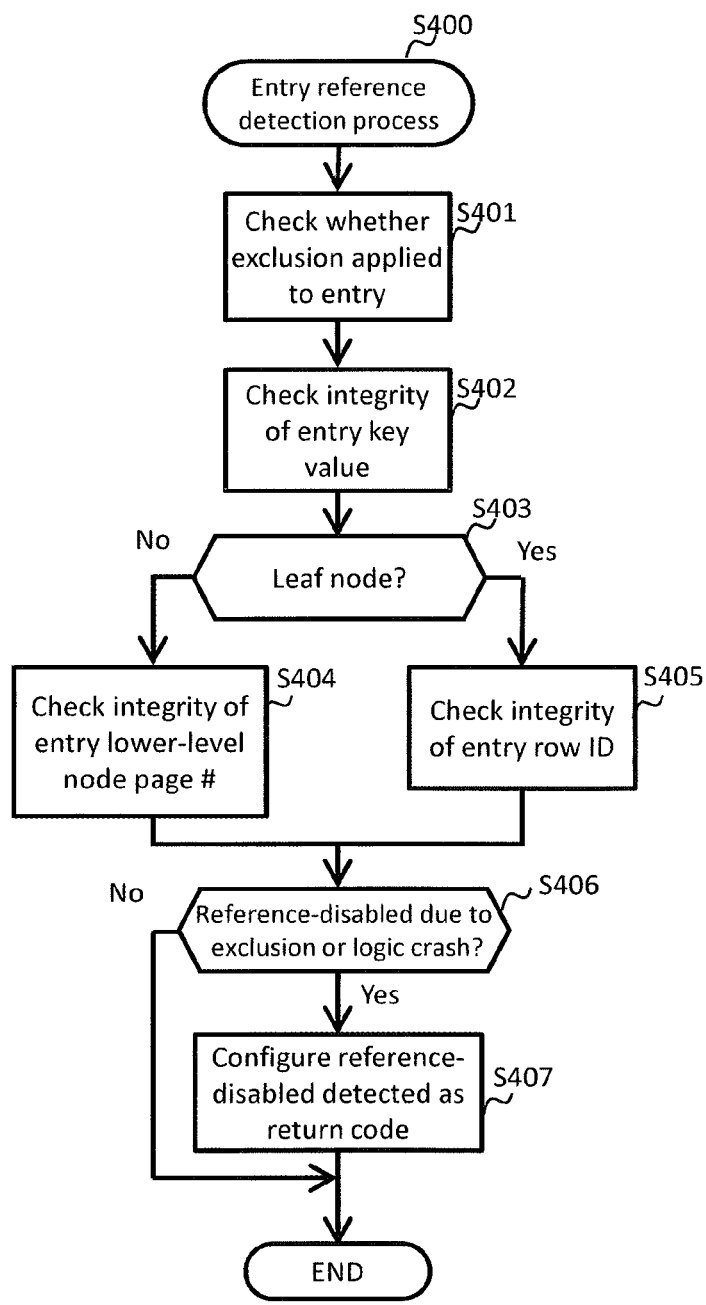
FIG. 13 is a flowchart of an example of an entry reference detection process related to the embodiment.

FIG. 13 is a flowchart of an entry reference detection process related to the embodiment.

The entry reference detection process (Step S400) is realized in accordance with the CPU 2102 executed the entry reference detection part 2114. In the entry reference detection process, the CPU 2102 checks whether or not an exclusion is being applied to the target entry (Step S401), and, in addition, checks whether or not logic integrity is being maintained for the target entry key value, in other words, checks whether or not a logic crash has occurred (Step S402). In this embodiment, the CPU 2102 checks whether or not the key value of the target entry 9104 is larger than the key value of the previous entry and smaller than the key value of the following entry in the node.

Next, the CPU 2102 determines whether or not the target node is a leaf node (Step S403), and when the target node is not a leaf node (Step S403: No), checks integrity with respect to the lower-level node page number of the entry (Step S404). Specifically, the CPU 2102 checks whether or not the page number in the entry 9104 matches the page number of the own page number 9106 of the lower-level node 9100 connected to the entry 9104 by a pointer.

Alternatively, when the target node is a leaf node (Step S403: Yes), the CPU 2102 checks integrity with respect to the entry row ID (Step S405). Specifically, the CPU 2102 checks whether or not the row ID in the entry 9104 matches the row ID 6101 of the table 6100 row connected to the entry 9104 by a pointer.

On the basis of the results of these checks, the CPU 2102 determines whether or not the target entry is reference-disabled due to either an exclusion or the occurrence of a logic crash (Step S406). When the result of the determination is that the target entry is reference-disabled (Step S406: Yes), the CPU 2102 configures reference-disabled detected as the return code (Step S407), and ends the processing, and, alternatively, when the target entry is not reference-disabled (Step S406: No), ends the processing as-is.

Figure 14:
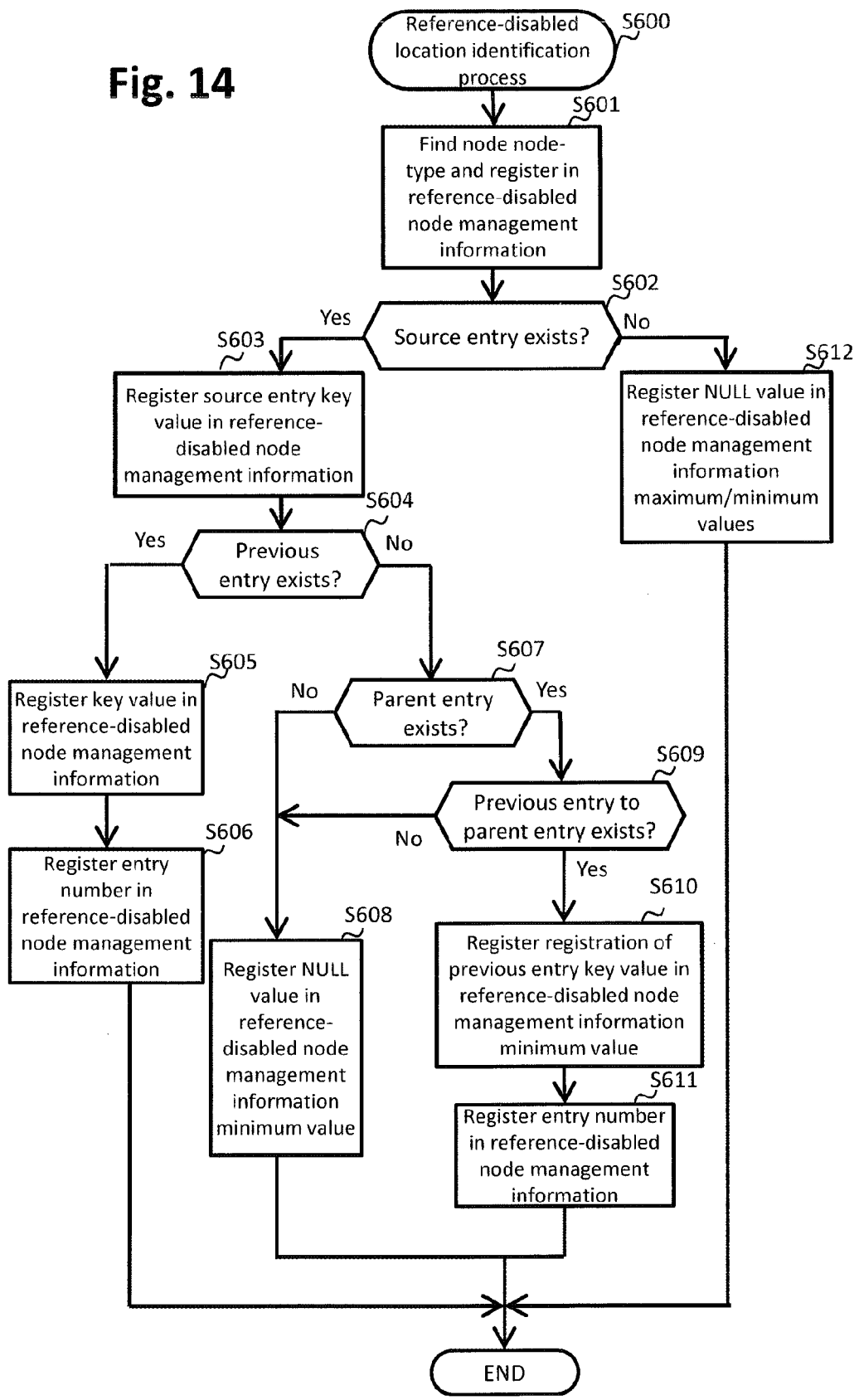
FIG. 14 is a flowchart of an example of a reference-disabled location identification process related to the embodiment.

FIG. 14 is a flowchart of a reference-disabled location identification process related to the embodiment.

The reference-disabled location identification process (Step S600) is realized in accordance with the CPU 2102 executing the reference-disabled location identification part 2115. In the reference-disabled location detection process, the CPU 2102, on the basis of the index level number 9105 of the node 9100 and the index level number management table 10000, determines the node type of the target node, and registers this node type in the reference-disabled node management information 11000 (Step S601).

Next, the CPU 2102 determines whether or not the source entry of the search program information 8110 exists in this search program information 8110 for the target node (Step S602). A case in which the result is that the source entry does not exist (Step S602: No) signifies that the node is a root node, and as such, the CPU 2102 registers a NULL value in the key-value minimum value 11001*a* and the key-value maximum value 11001*b* of the reference-disabled node management information 11000 (Step S612) and ends the processing. The source entry may be configured in the search program information when the search program information is created. Alternatively, when the source entry exists (Step S602: Yes), the CPU 2102 registers the key value of the source entry in the key-value maximum value 11001*b* of the reference-disabled node management information 11000 (Step S603), and determines whether or not a previous entry exists relative to the source entry (Step S604).

When the result is that a previous entry exists (Step S604: Yes), the CPU 2102 registers the key value of the previous entry in the key-value minimum value 11001*b* of the reference-disabled node management information 11000 (Step S605), registers the entry number of the previous entry in the previous entry #11003 of the reference-disabled node management information 11000 (Step S606), and ends the processing.

Alternatively, when a previous entry does not exist (Step S604: No), the CPU 2102 additionally determines whether or not a parent entry exists in the search program information with respect to the source entry (Step S607), and when a parent entry does not exist (Step S607: No), registers a NULL value in the key-value minimum value 11001*a* of the reference-disabled node management information 11000 (Step S608), and ends the processing. The parent entry may be configured in the search program information when the search program information is created.

Alternatively, when a parent entry exists (Step S607: Yes), the CPU 2102 determines whether or not a previous entry exists with respect to the parent entry (Step S609), and when a previous entry does not exist with respect to the parent entry (Step 609: No), registers a NULL value in the key-value minimum value 11001*a* of the reference-disabled node management information 11000 (Step S608), and ends the processing.

Alternatively, when a previous entry exists with respect to the parent entry (Step S609: Yes), the CPU 2102 registers the key value of the previous entry in the key-value minimum value 11001*a* of the reference-disabled node management information 11000 (Step S610), registers the entry number of the previous entry with respect to the parent entry in the previous entry #11003 of the reference-disabled node management information 11000 (Step S611), and ends the processing. The processing described hereinabove makes it possible to appropriately store a range of key values for each node in the reference-disabled node management information 11000.

Figure 15:
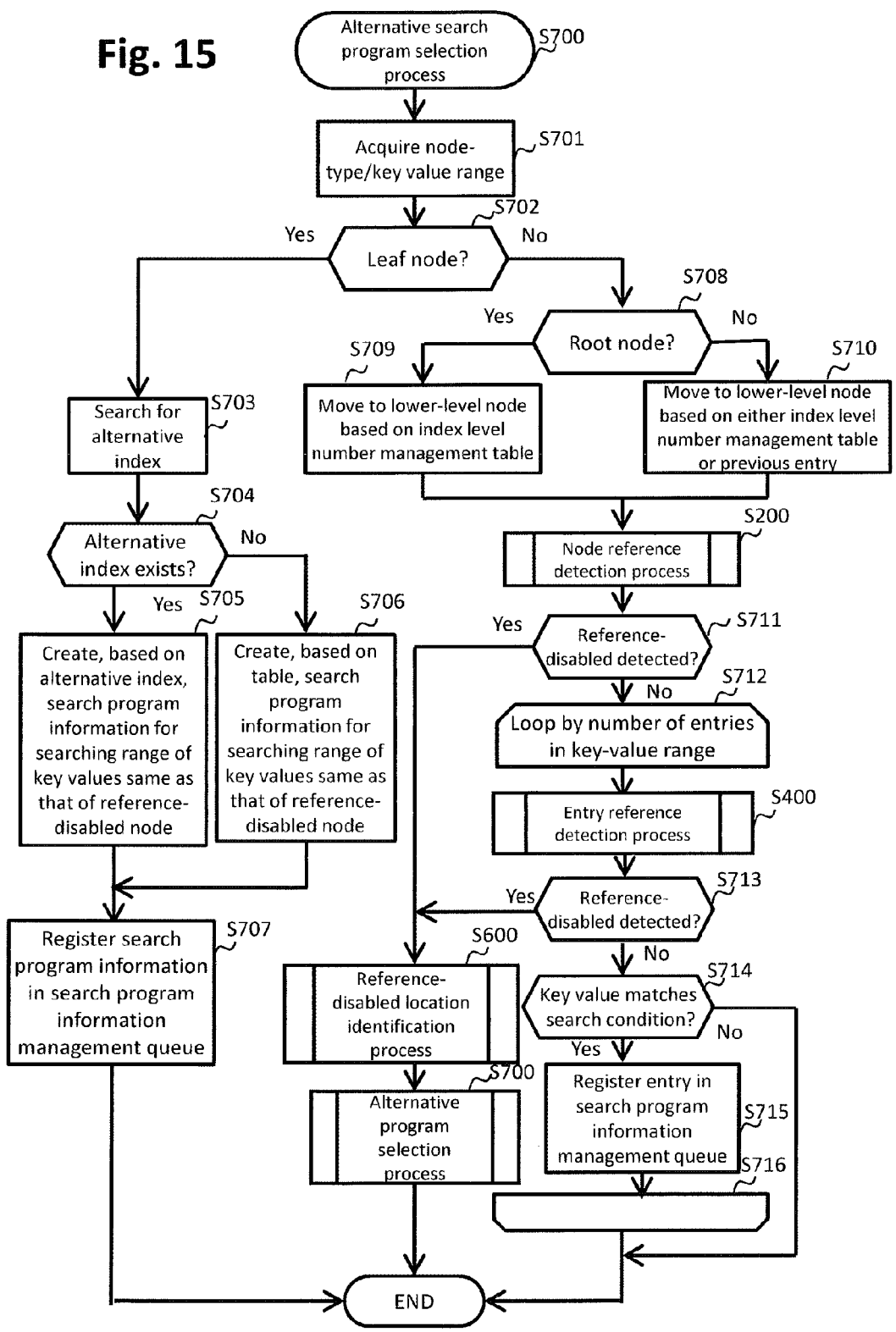
FIG. 15 is a flowchart of an example of an alternative search program selection process related to the embodiment.
Figure 16A:
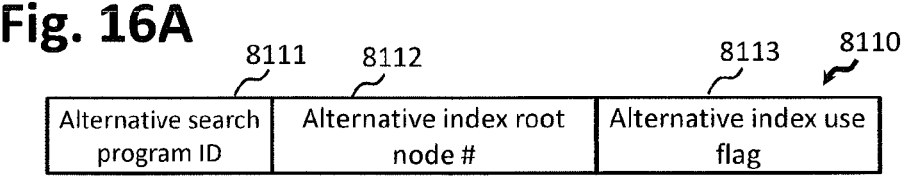
FIG. 16A is a drawing showing a first specific example of search program information related to the embodiment.
Figure 16B:
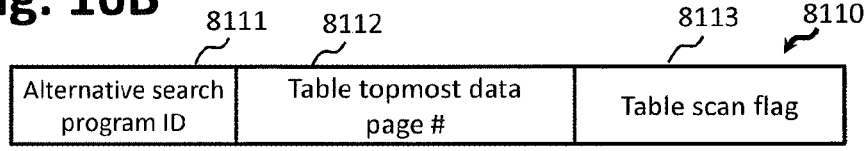
FIG. 16B is a drawing showing a second specific example of search program information related to the embodiment.
Figure 16C:
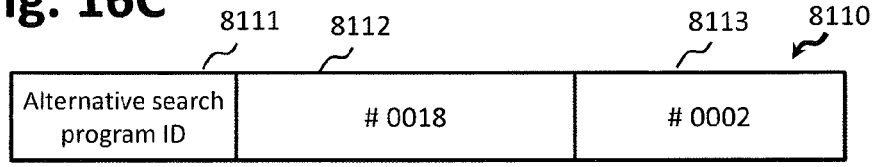
FIG. 16C is a drawing showing a third specific example of search program information related to the embodiment.

FIG. 15 is a flowchart of an example of an alternative search program selection process related to the embodiment. In the explanation of the flowchart here, reference will be made as needed to FIG. 16A through FIG. 16C. FIG. 16A is a drawing showing a first specific example of search program information related to the embodiment. FIG. 16B is a drawing showing a second specific example of search program information related to the embodiment. FIG. 16C is a drawing showing a third specific example of search program information related to the embodiment.

The alternative search program selection process (Step S700) is realized in accordance with the CPU 2102 executing the alternative search program selection part 2116. In the alternative search program selection process, the CPU 2102 acquires the node type and the node search range (key value range) from the reference-disabled node management information 11000 (Step S701), and determines whether or not the node type of the target node is a leaf node (Step S702).

When the result is that the target node is a leaf node (Step S702: Yes), the CPU 2102 searches the index management table 7100 for an index that includes the same configuration column as that of the index to serve as an alternative index (Step S703), and determines whether or not an alternative index exists (Step S704).

When an alternative index exists (Step S704: Yes), the CPU 2102 creates, based on the alternative index, search program information 8110 for searching a range of key values that is the same as that of the reference-disabled node (Step S705), and advances the processing to Step S707. The search program information 8110 created in Step S705, as shown in FIG. 16A, includes the alternative search program ID in the program ID 8111, the root node page number of the alternative index in the first area 8112, and a flag indicating that an alternative index is to be used in the second area 8113.

When the indexed search part 2120 acquires search program information 8110 like this, a search can be performed quickly since the CPU 2102 executes a search process using a portion of another index that already exists.

Alternatively, when an alternative index does not exist (Step S704: No), the CPU 2102, based on the table 6100, creates search program information for searching a range of key values that is the same as that of the reference-disabled node (Step S706), and advances the processing to Step S707. The search program information 8110 created in Step S706, as shown in FIG. 16B, includes the alternative search program ID in the program ID 8111, the page number at the top of the table 6100 in the first area 8112, and a flag indicating that the table is to be scanned in the second area 8113.

When the indexed search part 2120 acquires search program information 8110 like this, the time and load associated with the search process can be reduced in comparison to when the entire table 6100 is searched directly since the search of the table 6100 is limited to the same key value range as that of the reference-disabled node. The key value range of the reference-disabled node can be acquired from the reference-disabled node management information 11000.

In Step S707, the CPU 2102 registers the created search program information 8110 in the search program information management queue 8100 and ends the processing.

Alternatively, when the target node is not a leaf node (Step S702: No), the CPU 2102 determines whether or not the target node is a root node (Step S708). When the target node is a root node (Step S708: Yes), the CPU 2102, on the basis of the index level number management table 10000, moves to the lower-level node (Step S709) and executes the node reference detection process (Step S200). Alternatively, when the target node is not a root node (Step S708: No), the CPU 2102, on the basis of either the index level number management table 10000 or the previous entry, moves to the lower-level node (Step S710) and executes the node reference detection process (Step S200). As used here, the lower-level node signifies all the nodes indicated by the entries possessed by the target node.

For example, in the index shown in FIG. 5, in a case where the node #5 is reference-disabled, a method for moving to the lower-level node is to identify the previous entry (entry #0001) of the source entry (entry #0002) of node #5, move to node #8 on the basis of the entry #0001, move to node #6 on the basis of the last entry (entry #0005) of node #8, and move to node #4, that is, a topmost node (node directly below node #5) from among the lower-level nodes of node #5, on the basis of the following page # of node #6.

The below-described methods exist here as methods for tracing to the node directly below the reference-disabled node. For example, when an entry (source entry) referencing the target node does not exist, it is possible to trace down to the node directly below the reference-disabled node on the basis of the index level number management table 10000. Also, when a source entry exists, and an entry previous to the source entry (previous entry) exists, it is possible to trace down to the node directly below the reference-disabled node by using the previous entry of the source entry. When a source entry exists but a parent entry does not exist, it is possible to trace down to the node directly below the reference-disabled node on the basis of the index level number management table 10000. When a source entry exists, and a previous entry to the source entry does not exist but a previous entry to the parent entry does exist, it is possible to trace down to the node directly below the reference-disabled node on the basis of the previous entry to the parent entry. When a source entry and a parent entry exist, but a previous entry to the source entry and a previous entry to the parent entry do not exist, it is possible to trace down to the node directly below the reference-disabled node on the basis of the index level number management table 10000.

Next, the CPU 2102, on the basis of the result of the node reference detection process, determines whether or not reference-disabled was detected (Step S711), and when reference-disabled has not been detected (Step S711: No), executes a loop process comprising Step S711 through Step S716 for only the number of entries within the key value range of the reference-disabled node. Step S711 through Step S716 are executed here having as targets the entries of the lower-level nodes of the node being targeted. For example, when node #1, which is the root node shown in FIG. 5, is reference-disabled, the entries of node #8 and node #5 become the targets, and when node #5 is reference-disabled, the entries of node #4, node #3, and node #9 become the targets.

In the loop process, the CPU 2102 acquires one target entry, and executes the entry reference detection process in order to detect the reference status of the entry (Step S400). Next, when reference-disabled has not been detected (Step S713: No), the CPU 2102 determines whether or not the key value is consistent with the search condition (Step S714), and when the key value is consistent with the search condition, determines a search ID, creates search program information 8110, which includes the search ID, and stores the entry # of the entry in the first area 8112, registers the entry in the search program information management queue 8100 (Step S715), and advances to Step S716.

At this point, for example, when node #5 is reference-disabled, the loop processing of Step S711 through Step S716 is used to create search program information 8110, as shown in FIG. 16C, for searching all first area 8112 entries, that is, each entry from entry #0018 to entry 0026#, which are in node #4 and subsequent nodes and which satisfy the search condition.

Alternatively, either when reference-disabled has been detected for a node (Step S711: Yes) or when reference-disabled has been detected for an entry (Step S713: Yes), the CPU 2102 executes the reference-disabled location identification process (Step S600), executes the alternative search program selection process (Step S700), and ends the processing.

When the processing of Step S712 through S716 has been executed for all the entries in the range of key values of the reference-disabled node, the CPU 2102 determines whether or not the target node is a leaf node (Step S111) and ends the processing. This process makes it possible to appropriately execute a search with respect to a reference-disabled node search range.

An embodiment has been explained hereinabove, but it goes without saying that the present invention is not limited to this embodiment, and that various changes are possible within a scope that does not depart from the gist thereof.

For example, in the above-described embodiment, the configuration is such that an index is searched in ascending order from the smallest key value, but, for example, the configuration may be such that a search is performed in descending order from the largest key value. In this case, each node may manage the key-value minimum value of each node as the entry of the lower-level nodes, the node that manages the largest key value in the same level may become the previous node, and the index level number management table may manage the page numbers for managing the key-value maximum values of each level. In so doing, when the reference-disabled node is an intermediate node, the lower-level node relative to the reference-disabled node may be identified by tracing adjacent nodes that manage key values larger than that of the reference-disabled node.

Furthermore, in the above-described embodiment, an example in which search program information is fetched one piece at a time and executed sequentially was given, but the present invention is not limited to this, and, for example, a plurality of pieces of search program information may be fetched and searches may be executed in parallel on the basis thereof.

REFERENCE SIGNS LIST

2100 Server apparatus
1001 External storage apparatus
2150 Terminal apparatus

The invention claimed is:
1. A database system comprising:
a storage device; and
a control device communicatively coupled to the storage device, wherein the control device includes:
a memory,
a communication interface, and
a processor communicatively coupled to the memory and the communication interface;
wherein the storage device:
stores a table for managing a plurality of rows comprising a plurality of item values, an index in a tree structure comprising a plurality of nodes each with header and footer integrity information, and an alternative index; and
wherein the control device:
identifies, using the table, an item value condition included in a search condition of a search query for each of a plurality of search queries;
determines that a particular node from the plurality of nodes is reference-disabled when a first exclusion is applied to the particular node, a second exclusion is applied to a pointer associated with the particular node, or a header integrity check value of the particular node matches a footer integrity check value of the particular node, wherein the particular node corresponds to the item value condition; and
identifies, when the particular node is reference-disabled, an identified range of item values from the plurality of item values managed by the particular node, and search for a row from the plurality of rows that satisfies the search condition for the identified range of item values;
identifies, when the particular node is reference-disabled and is a root node, an identified lower-level previous node based on a level number management information and search for a row that satisfies the search condition, using the identified node and each node connected from the particular node; and
searches, when the particular node is reference-disabled and a leaf node, a range of item values that are equivalent to the particular node, based on the alternative index.

2. The database system according to claim 1,
wherein particular node is an intermediate node in the index, and the item value is managed by an immediately preceding node in a same level as the particular node.

3. The database system according to claim 2,
wherein the control device further:
identifies a lower-level node of the particular node, when the particular node is an intermediate node in the index, and
search for a row that satisfies the search condition for the identified range of item values, using the lower-level node.

4. The database system according to claim 3,
wherein the storage device further stores level number management information comprising a node number of a top node at each level of the index, and
wherein the control device further:
identifies a lower-level node by way of the immediately preceding node based on the management information, when the particular node is an intermediate node in the index and there is an entry in a node immediately preceding the particular node in a higher-level node relative to the particular node, and
identify a node of a lower-level level based on the level number management information and identify a lower-level node by way of the identified node, when there is no entry in a node immediately preceding to the particular node.

5. The database system according to claim 1, wherein the particular node:
stores either a page number of a lower-level node connected to the node or a row ID indicating a row connected to the node, and one or more entries, which comprise an item value, in accordance with the item values of the entries, and
wherein the control device determines whether the particular node is reference-disabled based on whether the entries of the node are lined up in accordance with the item value.

6. The database system according to claim 5,
wherein the node is provided with a pointer with respect to either the lower-level node or the connected row, and
wherein the control device determines whether the particular node is reference-disabled in accordance with whether either a page number or a row ID of a row in a node associated by virtue of the pointer matches either a page number or a row ID stored in the node.

7. The database system according to claim 1, wherein the storage device further stores a search program information queue that includes one or more pieces of search program information indicating either a node or a row that is to be a target of the search query,
wherein the control device further:
acquires acquired search program information sequentially from the search program information queue,
determines whether a node indicated by the acquired search program information is reference-disabled, and
output search program information for making an entry of the target of the search, and register the entry in the search program information queue, when an entry corresponding to a search condition is detected in the node.

8. The database system according to claim 1,
wherein the storage device further stores a search program information queue for enabling the storage of one or more pieces of search program information indicating either a node or a row that is to be a target of the search query,
wherein the control device further:
acquires search program information sequentially from the search program information queue,
determines whether a node indicated by the acquired search program information is reference-disabled, and
outputs search program information for making an entry of a target of the search query, and register the entry in the search program information queue, when an entry corresponding to a search condition has been detected in a lower-level node of the particular node.

9. A database management method, the database management method comprising:
identifying, by a processor, using a table stored in a memory of a storage device, an item value condition included in a search condition of a search query from a plurality of search queries, wherein the table includes a plurality of rows, a plurality of item values, an index in a tree structure comprising a plurality of nodes each with header and footer integrity information, and an alternative index organized;
determining, by the processor, whether a particular node from a plurality of nodes corresponding to the item value condition is reference-disabled based on whether an exclusion is applied to the particular node, whether an exclusion is applied to a pointer associated with the particular node, and whether a header integrity check value of the particular node matches a footer integrity check value of the particular node; and
when the particular node is reference-disabled, identifying, by the processor, an identified range of item values of the plurality of item values managed by the particular node, and searching for a row of the plurality of rows that satisfies the search condition for the identified range of values;
when the particular node is reference-disabled and is a root node, identifying, by the processor, an identified lower-level previous node based on a level number management information and search for a row that satisfies the search condition, using the identified node and each node connected from the particular node; and
when the particular node is reference-disabled and a leaf node, searching, by the processor, a range of item values that are equivalent to the particular node, based on the alternative index.

* * * * *